May 17, 1949. H. L. PROCTOR 2,470,720
SELF-LOCKING CHUCK
Filed May 31, 1947 2 Sheets-Sheet 1

Inventor
Harry L. Proctor
by Parker & Carter
Attorneys

May 17, 1949.　　　　H. L. PROCTOR　　　　2,470,720
SELF-LOCKING CHUCK

Filed May 31, 1947　　　　　　　　　　　　2 Sheets-Sheet 2

Inventor
Harry L. Proctor
by Parker & Carter
Attorneys

Patented May 17, 1949

2,470,720

UNITED STATES PATENT OFFICE 2,470,720

SELF-LOCKING CHUCK

Harry L. Proctor, Logansport, Ind., assignor to Logansport Machine Co. Inc., Logansport, Ind., a corporation of Indiana Application May 31, 1947, Serial No. 751,515

13 Claims. (Cl. 279—119)

My invention relates to improvements in self-locking chucks. Chucks for holding work in place to perform a turning operation are well known. They are actuated mechanically, hydraulically, pneumatically and electrically. One of the serious problems is to insure that the chuck will hold the work at high speed without the possibility of the chuck jaws moving outward due to centrifugal force and releasing the work, even though the power, whatever it may be, which actuates the chuck jaws and normally holds them in work gripping position, may fail. My self-locking chuck may be opened and closed under the control of the operator, but will automatically and permanently remain closed after it has gripped the work until the operator actually manipulates it for release.

My invention is illustrated more or less diagrammatically in the accompanying drawings wherein.

Like parts are indicated by like symbols throughout the specification and drawings.

Figure 1:
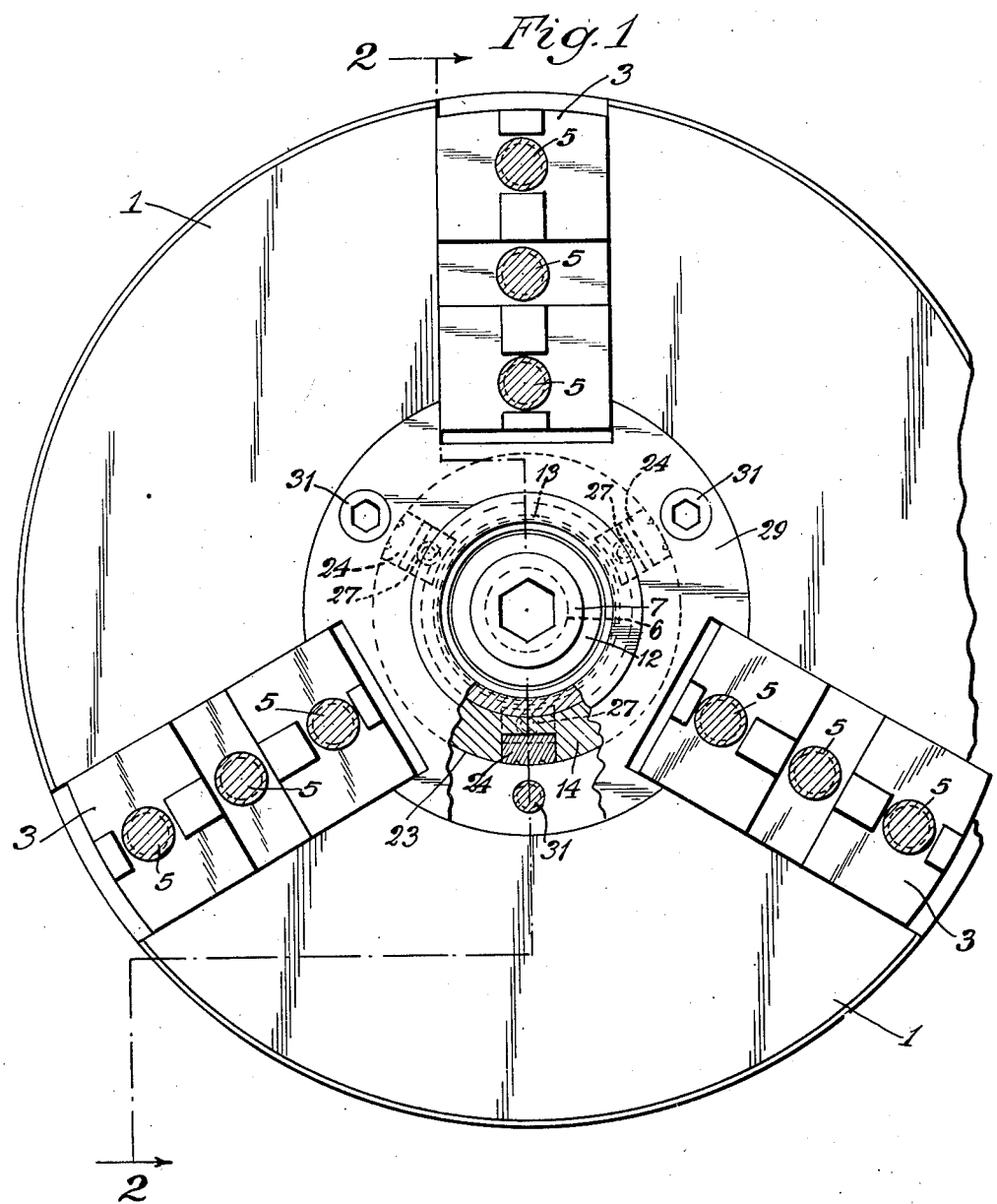
Figure 1 is a front elevation, with parts cut away.

1 is a chuck housing. It is recessed at 2 to engage and be mounted on any suitable lathe spindle not here illustrated. 3 indicates the three master jaws of the chuck. They are movable radially toward and from the center of rotation. 4 are false jaws attached to each of the master jaws 3 designed to fit the work-piece. They are held in position by removable screws 5 threaded in the master jaws 3. 6 is the draw stud actuated by mechanical, electrical, pneumatic or hydraulic means, as the case may be, not here illustrated. The draw stud has a head 7 and is threaded to be engaged by nuts 8 and 9 locked one against the other. 11 is a flanged lock release sleeve on the draw stud. 12 is the lock sleeve washer. 13 is the draw stud collar threaded in the drawsleeve 14. The lock release sleeve 11 and the lock sleeve washer 12 are held in a fixed position on the draw stud 6 between the head 7 and the nut 8 and is slidable and rotatable in the draw stud collar 13. 14 is the drawsleeve which is slidable in the central bore 23 in the chuck housing 1. 15 is the jaw actuating lever. There are three of them; one for each master jaw 3. Each lever is mounted on a pivot 16 supported in the chuck housing 1. 17 is a jaw block slidable in the chuck jaw 2 in a direction parallel with the axis of rotation of the chuck, being closely fitted in the aperture 18 against radial movement. The jaw block 17 is pivoted to one end of the lever 15 at 19. 20 is the drawsleeve block socketed in the aperture 21, in the drawsleeve 14, so as to permit radial movement and prevent axial movement of the block with respect to the drawsleeve 14. The lever 15 and the draw sleeve block 20 are pivoted together at 22. 23 is a central bore in the chuck housing 1 parallel with the axis of the draw stud 6. Sliding in this bore 23 is the drawsleeve 14 having a tapered locking shoe 24 opposite each master jaw 3. The locking shoe 24 increases in thickness toward the front of the chuck and mates with a similar locking tapered surface 25 cut as a keyway in the drawsleeve 14. Locking shoe 24 has a head 26 engaged by a shoe tension spring 27 which at the opposite end abuts on a shoulder 28 in the drawsleeve 14. The chuck end of the drawsleeve 14 is counterbored to provide a sliding fit over the inwardly extended portion of the pilot bushing 29. Pilot bushing 29 is also outwardly flanged at 30 to make a sliding fit with the inner end of the master jaws 3, both joints providing a dirt seal. This pilot bushing 29 is recessed into the chuck housing 1 and held there by screws 31.

Figure 2:
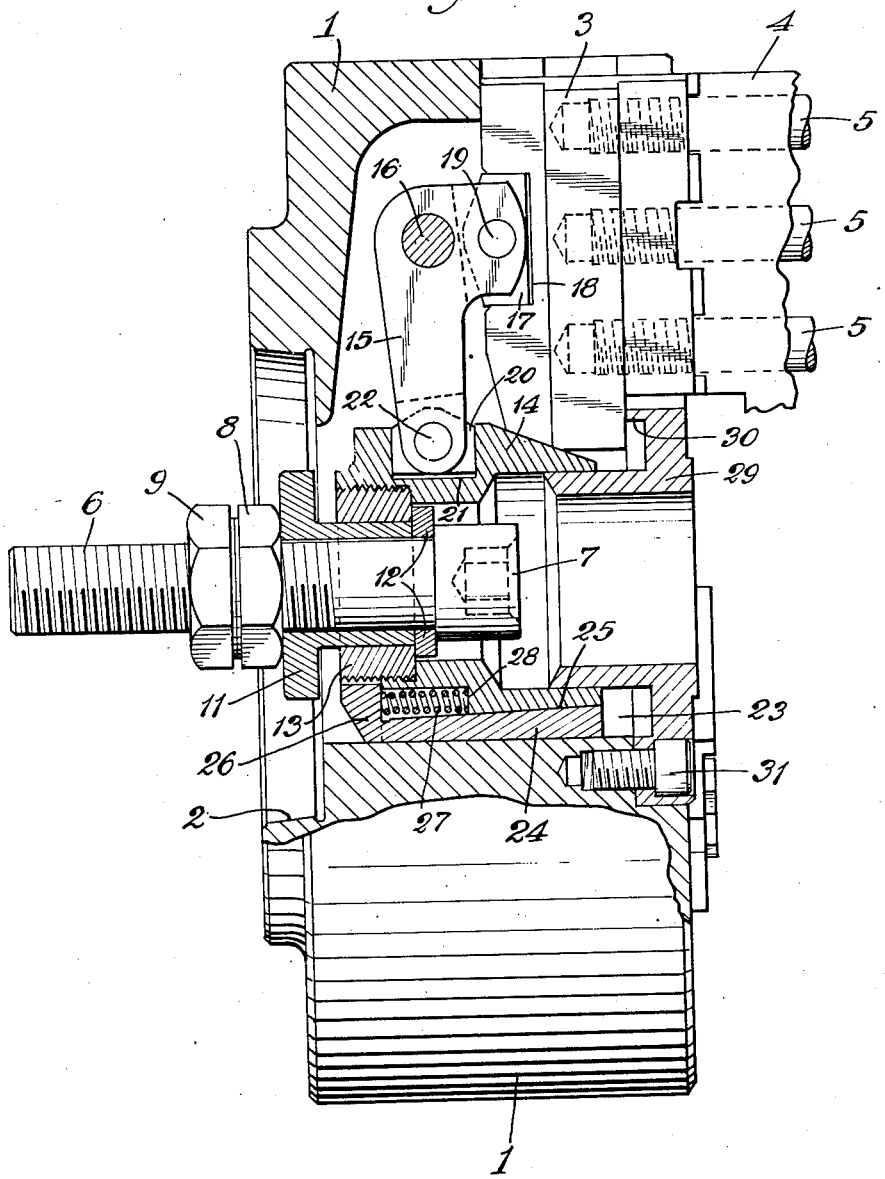
Figure 2 is a part section along the line 2—2 of Figure 1.

The use and operation of my invention are as follows:

The chuck is mounted on the face plate or spindle of the lathe in the usual manner. The draw stud is connected to the draw stud operating mechanism which might be a mechanical member, a hydraulic or pneumatic piston, or an electromagnet or solenoid. With the parts as shown in Figure 2, the false jaw being in place, the work is presented to the chuck and the operator causes the draw stud to move to the left. The draw sleeve 14 comes with it and moves the inner end of each of the levers 15 toward the left. This causes the outer end of the levers 15 to move radially inward carrying with them the master jaws 3 and the false jaws 4 to grip the work.

Under these circumstances, if the lathe starts to turn and something goes wrong with the draw bar actuating mechanism, centrifugal force will cause the master jaws and the false jaws to move radially outward to release the work. It is to avoid this that my invention has been made.

As the draw sleeve 14 is moved to the left by the draw stud, it compresses the shoe tension spring 27 and causes the locking shoe 24 to move to the left with the draw sleeve 14 thus maintaining the tapered surfaces 25 on locking shoe and draw sleeve together. If tension on the draw stud 6 should fail, centrifugal force applied to the master jaws 3 and false jaws 4 would tend to rotate the lever 15 about its pivot point 16, the jaws tending to move the block 17 outwardly. This action would tend to move the draw sleeve 14 in the chuck opening direction or to the right. However, this is resisted by the presence of the locking shoe and any tendency on the part of the draw sleeve 14 to move to the right merely causes it to try to slide up on the locking taper thus locking the draw sleeve more firmly in position. So a mere failure on the part of the draw stud holding means will not cause chuck release.

The chuck can be released, however, when the draw stud 6 moves to the right. Under these circumstances the lock release sleeve 11 will move to the right, the lock sleeve washer 12 will thus be taken out of contact with the draw stud collar 13 and the draw stud collar 13 will remain at rest with the chuck still locked until the flange at the inner end of the lock release sleeve 11 engages the opposed face of the draw stud collar 13, tending to move it to the right. But it cannot move to the right unless the locking shoe moves at the same time so the lug 26 on the locking shoe 24 is also engaged by the flange on the lock release sleeve 11, and under these circumstances the locking shoe 24 and the draw sleeve 14 may both move in unison to the right to cause the levers 15 to rotate about their pivot 16 and move the master jaws 3 radially outward, and this movement can continue until the maximum open position has been reached and the work is released.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

I claim:

1. In a chuck, a draw sleeve and a locking shoe, having opposed inclined locking surfaces, means engaging the sleeve alone to move it in jaw closing direction, a spring between the shoe and the sleeve adapted to hold the surfaces together and cause the shoe to follow the sleeve in such movement, means engaging the sleeve and the shoe to move them together in the jaw opening direction.

2. In a chuck, a housing, a draw sleeve mounted for axial movement and chuck jaws mounted for radial movement therein, actuating levers between the sleeve and the jaws whereby axial movement of the sleeve imparts radial movement to the jaws, the draw sleeve having a draw stud collar, a lock release sleeve in slidable engagement with the draw stud collar, flanged at one end and having a washer at the other end, the space between the flange and the washer being greater than the axial length of the draw stud collar, a locking shoe slidable in the chuck housing, opposed surfaces of the shoe and the sleeve being inclined to the axis of the chuck, a spring interposed between the shoe and the draw sleeve tending to draw the inclined locking surfaces of shoe and draw sleeve together.

3. In a chuck, a housing, a draw sleeve mounted for axial movement and chuck jaws mounted for radial movement therein, actuating levers between the sleeve and the jaws whereby axial movement of the sleeve imparts radial movement to the jaws, the draw sleeve having a draw stud collar, a lock release sleeve in slidable engagement with the draw stud collar, flanged at one end and having a washer at the other end, the space between the flange and the washer being greater than the axial length of the draw stud collar, a locking shoe slidable in the chuck housing, opposed surfaces of the shoe and the sleeve being inclined to the axis of the chuck, a spring interposed between the shoe and the draw sleeve tending to draw the inclined locking surfaces of shoe and draw sleeve together, a draw stud on which the lock release sleeve is mounted, the lock sleeve washer being adapted to engage the draw stud collar only to move the draw sleeve under tension from the draw stud in chuck jaw closing position.

4. In a chuck, a housing, a draw sleeve mounted for axial movement and chuck jaws mounted for radial movement therein, actuating levers between the sleeve and the jaws whereby axial movement of the sleeve imparts radial movement to the jaws, the draw sleeve having a draw stud collar, a lock release sleeve in slidable engagement with the draw stud collar, flanged at one end and having a washer at the other end, the space between the flange and the washer being greater than the axial length of the draw stud collar, a locking shoe slidable in the chuck housing, opposed surfaces of the shoe and the sleeve being inclined to the axis of the chuck, a spring interposed between the shoe and the draw sleeve tending to draw the inclined locking surfaces of shoe and draw sleeve together, a draw stud on which the lock release sleeve is mounted, the lock sleeve washer being adapted to engage the draw stud collar only to move the draw sleeve under tension from the draw stud in chuck jaw closing position, the collar on the lock release sleeve being adapted when the draw stud is moved in the opposite direction to engage both the shoe and the draw stud collar to move them both in unison in the jaw opening direction.

5. In a chuck, a housing, a draw sleeve mounted for axial movement, and chuck jaws mounted for radial movement therein, actuating means between the sleeve and the jaws whereby axial movement of the sleeve imparts radial movement to the jaws means for displacing the sleeve axially to close the chuck jaws, means interposed between the housing and the sleeve for automatically locking the sleeve against jaw release movement by centrifugal force.

6. In a chuck, a housing, a draw sleeve mounted for axial movement, and chuck jaws mounted for radial movement therein, actuating means between the sleeve and the jaws whereby axial movement of the sleeve imparts radial movement to the jaws, means interposed between the housing and the sleeve for locking the sleeve against jaw release movement, said locking means including a tapered locking shoe and yielding means for holding it in locking engagement with the sleeve.

7. In a chuck, a housing, a draw sleeve mounted for axial movement, and chuck jaws mounted for radial movement therein, actuating means between the sleeve and the jaws whereby axial movement of the sleeve imparts radial movement to the jaws means for displacing the sleeve axially to close the chuck jaws, means interposed between the housing and the sleeve for automatically locking the sleeve against jaw release movement, means adapted to engage the sleeve alone for moving it into jaw locking position.

8. In a chuck, a housing, a draw sleeve mounted for axial movement, and chuck jaws mounted for radial movement therein, actuating means between the sleeve and the jaws whereby axial movement of the sleeve imparts radial movement to the jaws, means interposed between the housing and the sleeve for locking the sleeve against jaw release movement, said locking means including a tapered locking shoe and yielding means for holding it in locking engagement with the sleeve and means adapted to engage the sleeve along for moving it into jaw locking position.

9. In a chuck, a housing, a draw sleeve mounted for axial movement, and chuck jaws mounted for radial movement therein, actuating means between the sleeve and the jaws whereby axial movement of the sleeve imparts radial movement to the jaws, means interposed between the housing and the sleeve for locking the sleeve against jaw release movement, means adapted to engage the sleeve alone for moving it into jaw locking position, and said means being adapted to engage both the sleeve and the locking means to move them into jaw releasing position.

10. In a chuck, a housing, a draw sleeve mounted for axial movement, and chuck jaws mounted for radial movement therein, actuating means between the sleeve and the jaws whereby axial movement of the sleeve imparts radial movement to the jaws, means interposed between the housing and the sleeve for locking the sleeve against jaw release movement, said locking means including a tapered locking shoe and yielding means for holding it in locking engagement with the sleeve and means adapted to engage the sleeve alone for moving it into jaw locking position, and said means being adapted to engage both the sleeve and the shoe to move them into jaw releasing position.

11. In a chuck, a draw sleeve, a draw stud associated therewith, a locking shoe in engagement with the draw sleeve, sleeve and shoe having inclined oppositely engaged locking surfaces, a spring interposed between the shoe and the sleeve adapted to hold said surfaces together, means for moving the sleeve in jaw closing direction whereby the spring causes the shoe to follow the sleeve and hold the locking surfaces together to prevent return movement of the sleeve and means adapted to engage both the sleeve and the shoe to positively move them simultaneously in the opposite direction against the pressure of the spring.

12. In a chuck, a housing, radially movable jaws, an axially movable draw sleeve, jaw operating levers between them, a draw stud and a sliding connection between it and the draw sleeve, a tapered locking shoe in opposition to the draw sleeve and the housing, a spring between the sleeve and the shoe adapted to hold the shoe in sleeve locking position, means for moving the stud in one direction to move the draw sleeve so that it rotates the levers to clamp the jaws, means for moving the stud in the opposite direction for a predetermined distance without movement of the draw sleeves and for thereafter causing the stud as it continues its movement to overcome the spring pressure and move the draw sleeve and the locking shoes in unison toward the jaw unlocking position.

13. In a chuck, a housing, a draw sleeve mounted for axial movement and chuck jaws mounted for radial movement therein, a driving connection between them whereby axial movement of the draw sleeve causes radial movement of the jaws, locking means within the housing movable in consonance with the jaws and draw sleeve adapted automatically to prevent centrifugal movement of the jaws, means responsive to draw sleeve movement in clutch opening position for disengaging the locking means during such movement to permit centrifugal movement of the jaws, said locking means offering no resistance to centripetal jaw movement.

HARRY L. PROCTOR.

REFERENCES CITED

The following references are of record in the file of this patent:

UNITED STATES PATENTS

| Number | Name | Date |
|---|---|---|
| 1,711,787 | Hopkins | May 7, 1929 |